(12) United States Patent
Neyman et al.

(10) Patent No.: US 8,090,643 B2
(45) Date of Patent: *Jan. 3, 2012

(54) COMPOUND ORDER HANDLING IN AN ANONYMOUS TRADING SYSTEM

(75) Inventors: Vladimir Neyman, West Orange, NJ (US); Steven Iaccheo, Pompton Lakes, NJ (US); Neena Jain, South Plainfield, NJ (US); James Shu, East Hanover, NJ (US); Edward Howorka, Morris Plains, NJ (US); Andrew Foray, Wayne, NJ (US); Michael Merold, Sparta, NJ (US)

(73) Assignee: EBS Group Limited, London (GB)

( * ) Notice: Subject to any disclaimer, the term of this patent is extended or adjusted under 35 U.S.C. 154(b) by 832 days.

This patent is subject to a terminal disclaimer.

(21) Appl. No.: 11/841,675

(22) Filed: Aug. 20, 2007

(65) Prior Publication Data

US 2008/0040256 A1    Feb. 14, 2008

Related U.S. Application Data

(63) Continuation of application No. 09/603,389, filed on Jun. 23, 2000, now Pat. No. 7,333,952.

(51) Int. Cl.
*G06Q 40/00* (2006.01)
(52) U.S. Cl. ............................................. 705/37
(58) Field of Classification Search .............. 705/35–37
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 3,823,387 A | 7/1974 | McClellan | |
| 4,388,489 A | 6/1983 | Wigan et al. | |
| 4,412,287 A | 10/1983 | Braddock, III | |
| 4,525,779 A | 6/1985 | Davids et al. | |
| 4,531,184 A | 7/1985 | Wigan et al. | |
| 4,554,418 A | 11/1985 | Toy | |
| 4,555,781 A | 11/1985 | Baldry et al. | |
| 4,598,367 A | 7/1986 | DeFrancesco et al. | |

(Continued)

FOREIGN PATENT DOCUMENTS

EP    0411748    5/1990

(Continued)

OTHER PUBLICATIONS

Udo Broil, Kit Pong Wong; "Hedging with Mismatched Currencies"; Hoboken, Dec. 1999; The Journal of Future Markets vol. 19, Iss. 8, p. 859.

(Continued)

*Primary Examiner* — Hani Kazimi
(74) *Attorney, Agent, or Firm* — Dickstein, Shapiro LLP

(57) ABSTRACT

Joint execution type compound orders can be processed in an anonymous trading system comprising a plurality of broker nodes each of which includes an order matching functionality and a market distribution functionality. Trader agent nodes are connected to a number of dealer terminals grouped in trading floors and also to a broker node. Joint execution orders are entered as hit orders and are all matched by the broker during the hit or the order is cancelled. If matches are made the taker's trading agent does not complete any of the deals marking up the order until it knows that all the deals are executable. The system may be used to allow traders to hit bids and offers in currency pairs synthesised from other currency pairs. In this arrangement the dealer enters a simple order in the synthetic currency and the taker's trading agent converts it into a joint execution order.

19 Claims, 12 Drawing Sheets

U.S. PATENT DOCUMENTS

| | | | |
|---|---|---|---|
| 4,623,964 A | 11/1986 | Getz et al. |
| 4,674,044 A | 6/1987 | Kalmus et al. |
| 4,750,135 A | 6/1988 | Boilen |
| 4,815,030 A | 3/1989 | Cross et al. |
| 4,903,201 A | 2/1990 | Wagner |
| 4,980,826 A | 12/1990 | Wagner |
| 5,003,473 A | 3/1991 | Richards |
| 5,034,916 A | 7/1991 | Ordish |
| 5,077,665 A | 12/1991 | Silverman et al. |
| 5,136,501 A | 8/1992 | Silverman et al. |
| 5,195,031 A | 3/1993 | Ordish |
| 5,230,048 A | 7/1993 | Moy |
| 5,257,369 A | 10/1993 | Skeen et al. |
| 5,267,148 A | 11/1993 | Kosaka et al. |
| 5,270,922 A | 12/1993 | Higgins |
| 5,283,829 A | 2/1994 | Anderson |
| 5,287,787 A | 2/1994 | Inoue |
| 5,375,055 A | 12/1994 | Togher et al. |
| 5,508,913 A | 4/1996 | Yamamoto et al. |
| 5,557,780 A | 9/1996 | Edwards et al. |
| 5,557,798 A | 9/1996 | Skeen et al. |
| 5,615,269 A | 3/1997 | Micali |
| 5,710,889 A | 1/1998 | Clark et al. |
| 5,727,165 A | 3/1998 | Ordish et al. |
| 5,761,661 A | 6/1998 | Coussens et al. |
| 5,787,402 A | 7/1998 | Potter et al. |
| 5,809,483 A | 9/1998 | Broka et al. |
| 5,809,489 A | 9/1998 | Davidor |
| 5,815,665 A | 9/1998 | Teper et al. |
| 5,864,827 A | 1/1999 | Wilson |
| 5,870,544 A | 2/1999 | Curtis |
| 5,890,140 A | 3/1999 | Clark et al. |
| 5,905,248 A | 5/1999 | Russell et al. |
| 5,905,974 A | 5/1999 | Fraser et al. |
| 5,909,545 A | 6/1999 | Frese, II et al. |
| 5,915,209 A | 6/1999 | Lawrence |
| 5,924,082 A | 7/1999 | Silverman et al. |
| 5,924,083 A | 7/1999 | Silverman et al. |
| 5,940,811 A | 8/1999 | Norris |
| 5,950,176 A | 9/1999 | Keiser et al. |
| 5,963,923 A | 10/1999 | Garber |
| 5,966,531 A | 10/1999 | Skeen et al. |
| 6,012,044 A | 1/2000 | Maggioncalda et al. |
| 6,014,627 A | 1/2000 | Togher et al. |
| 6,014,643 A | 1/2000 | Minton |
| 6,029,146 A | 2/2000 | Hawkins et al. |
| 6,045,176 A | 4/2000 | Shoup |
| 6,178,441 B1 | 1/2001 | Elnozahy |
| 6,205,433 B1 | 3/2001 | Boesch et al. |
| 6,247,000 B1 | 6/2001 | Hawkins et al. |
| 6,282,521 B1 | 8/2001 | Howorka |
| 6,343,278 B1 | 1/2002 | Jain et al. |
| 6,615,188 B1 | 9/2003 | Breen et al. |
| 6,691,094 B1 | 2/2004 | Herschkorn |
| 6,996,541 B2 | 2/2006 | Togher et al. |
| 7,194,481 B1 | 3/2007 | Van Roon et al. |
| 7,231,363 B1 | 6/2007 | Hughes et al. |

FOREIGN PATENT DOCUMENTS

| | | |
|---|---|---|
| EP | 0399850 | 11/1990 |
| EP | 0434224 | 6/1991 |
| EP | 0512702 | 4/1992 |
| EP | 0485252 | 5/1992 |
| EP | 0512702 | 11/1992 |
| EP | 0798635 | 10/1997 |
| EP | 0818746 | 1/1998 |
| EP | 0893758 | 1/1999 |
| EP | 0907134 | 4/1999 |
| FR | 2543327 | 9/1984 |
| GB | 1489574 | 10/1977 |
| GB | 2165421 | 4/1986 |
| GB | 2180380 | 3/1987 |
| GB | 2210714 | 6/1989 |
| GB | 2282246 | 3/1995 |
| GB | 2325130 | 11/1998 |
| GB | 2326256 | 12/1998 |
| WO | WO-90/02382 | 3/1990 |
| WO | WO-92/07324 | 4/1992 |
| WO | WO-92/15174 | 9/1992 |
| WO | WO-93/15467 | 8/1993 |
| WO | WO-94/15294 | 7/1994 |
| WO | WO-95/06918 | 3/1995 |
| WO | WO-95/18418 | 7/1995 |
| WO | WO-95/30211 | 11/1995 |
| WO | WO-96/18963 | 6/1996 |
| WO | WO-96/34357 | 10/1996 |
| WO | WO-97/22072 | 6/1997 |
| WO | WO-97/24833 | 7/1997 |
| WO | WO-97/31322 | 8/1997 |
| WO | WO-97/33215 | 9/1997 |
| WO | WO-97/36253 | 10/1997 |
| WO | WO-97/43727 | 11/1997 |
| WO | WO-97/45802 | 12/1997 |
| WO | WO-97/49050 | 12/1997 |
| WO | WO-98/05011 | 2/1998 |
| WO | WO-98/13796 | 4/1998 |
| WO | WO-98/21667 | 5/1998 |
| WO | WO-98/24041 | 6/1998 |
| WO | WO-98/26344 | 6/1998 |
| WO | WO-98/26363 | 6/1998 |
| WO | WO-98/36456 | 8/1998 |
| WO | WO-98/38558 | 9/1998 |
| WO | WO-98/41942 A1 | 9/1998 |
| WO | WO-98/47268 | 10/1998 |
| WO | WO-98/49635 | 11/1998 |
| WO | WO-98/49639 | 11/1998 |
| WO | WO-98/53581 | 11/1998 |
| WO | WO-99/01983 | 1/1999 |
| WO | WO-99/08419 | 2/1999 |
| WO | WO-99/10795 | 3/1999 |
| WO | WO-99/10815 | 3/1999 |
| WO | WO-99/14695 | 3/1999 |
| WO | WO-99/19821 | 4/1999 |
| WO | WO-99/27477 | 6/1999 |
| WO | WO-99/33242 | 7/1999 |
| WO | WO-99/35583 | 7/1999 |
| WO | WO-99/36875 | 7/1999 |
| WO | WO-99/40502 | 8/1999 |
| WO | WO-99/41690 | 8/1999 |
| WO | WO-99/50771 | 10/1999 |
| WO | WO-00/16224 | 3/2000 |
| WO | WO-01/09757 A2 | 2/2001 |
| WO | WO-01/50329 | 7/2001 |
| WO | WO-02/47006 A1 | 6/2002 |
| WO | WO-03/034184 A2 | 4/2003 |

OTHER PUBLICATIONS

UK Search Report issued Feb. 2, 2001 (in English).
Mini Computer Forum, Conference Proceedings, 1975.
Wall Street Computer Review, 1998.
Computers in the City, Conference Proceedings, 1988.
Banking Technology, 1988, vol. 5, No. 5.
www.MTRADER.COM/ecn.hgtm, Copyright 1998.
www.TA-CORP.NET/soesrules.htm, Copyright 1998.
Australian Patent Office Search Report, mailed Nov. 29, 2002, issued for counterpart application No. SG 200200927-2.
UK Search Report mailed May 14, 2001 issued for counterpart application GB 0101429.9.
Mori, Shinkichi et al.; "Practice for Life Assurance Business"; Finance, Ist edittion, vol. 5, published by Yuhikaku Publishing Co Ltd., Nov. 30, 1990, pp. 304-307 (English translation attached).

|  | Available | Reserved | Done | Total |
|---|---|---|---|---|
| Order 1 | 100 | 0 | 0 | 100 |
| Order 2 | 100 | 0 | 0 | 100 |
| Order 3 | 100 | 0 | 0 | 100 |
| Limit | 100 | 0 | 0 | 100 |

Figure 8

|  | Available | Reserved | Done | Total |
|---|---|---|---|---|
| Order 1 | 60 | 0 | 40 | 100 |
| Order 2 | 60 | 20 | 20 | 100 |
| Order 3 | 100 | 0 | 0 | 100 |
| Limit | 20 | 20 | 60 | 100 |

Figure 9

|  | Available | Reserved | Done | Total |
|---|---|---|---|---|
| Order 1 (canceled) | 0 | 0 | 60 | 100 |
| Order 2 (canceled) | 0 | 0 | 40 | 100 |
| Order 3 (canceled) | 0 | 0 | 0 | 100 |
| Limit | 0 | 0 | 100 | 100 |

Figure 10

COMPOUND ORDER HANDLING IN AN ANONYMOUS TRADING SYSTEM

CROSS-REFERENCE TO RELATED APPLICATION

This application is a continuation of U.S. patent application Ser. No. 09/603,389, filed on Jun. 23, 2000.

FIELD OF THE INVENTION

This invention relates to electronic brokerage systems and in particular to systems in which counterparties trade anonymously within fixed credit limits. Such systems may trade financial instruments such as foreign exchange and forward rate agreements. The invention is particularly concerned with the handling of compound orders input into such systems. Compound orders may be multiple orders which are subject to a limit or condition or joint execution orders where a number of orders must all be executed or none at all.

BACKGROUND TO THE INVENTION

A number of anonymous trading systems are known in the art. EP-A-0,399,850, EP-A-0,406,026 and EP-A-0,411,748 all assigned to Reuters Ltd disclose aspects of an automated matching system in which a host computer maintains a central database of bids and offers submitted by terminals connected to the host via a network. The host also maintains records of credit limits between each trading bank and the possible counterparties with which it is willing to trade. The host computer uses information in its central database to match bids and offers and buy and sell orders based on matching criteria which include the counter party credit limits.

Generally, counterparty credit limits are set for each bank or each trading floor and the host computer establishes a gross counter party credit limit for each possible pair of counterparties. The gross counter party credit limit is the minimum amount of remaining credit between two counterparties.

A trader's terminal will display a subset of the trading book, typically the best few bids and offers. These will be updated periodically to ensure that the trader sees the true state of the market.

A problem with the system outlined above is that the trader sees the bids and offers irrespective of whether he has sufficient credit with the counter party submitting that bid or offer to trade. As a result, a trader can attempt to trade when there is no available credit. As the system is anonymous the trader has no knowledge of the counterparty until a trade as been completed and so, when he hits a bid or offer, has no idea as to whether it is likely to be accepted or rejected for lack of credit. This is extremely frustrating for a trader, particularly in a fast moving market in which trading opportunities can easily be lost. The problem arises as the host computer only checks available credit after a deal has been proposed and a potential match identified.

This problem was solved in WO93/15467 now assigned to EBS Dealing Resources inc. Instead of displaying the actual trading book, or a part of it, to each trader, a different market view is shown to each trader in which bids and offers from counterparties which whom they have insufficient or no credit are screened out. Thus, the trader only sees prices with which he knows he can deal.

The architecture of the system of WO93/15467 is very different from the of the Reuters system and is based on a distributed network with a number of arbitrators which perform matching. Actual credit limits are stored at local bank nodes to which each of a bank's trading terminals are connected ensuring that sensitive credit data does not leave the bank's physical site. The actual trading book is sent by the arbitrators to the market distributor. The market distributor forms a market view specific to a given trading floor and sends it to the relevant bank node. A different market view may be formed for each trading floor depending on credit criteria. Thus, the market view which is distributed to each of the bank nodes is the complete market view with credit screening taking place, the market distributor to filter out any prices with which the bank, or a given trading floor within the bank, has insufficient credit.

In addition, the market distributors also have limited credit information, maintaining a credit matrix which may store a simple "yes-no" credit indicator for given counterparties. When a match is made, the prices having already been screened for credit, the bank node will make a second credit check using the credit matrix to see whether any previously extended credit has already been exhausted.

In particular they are only able to accept the most limited few of orders to trade which is a simple order to buy or sell. In practice, traders often wish to place more sophisticated orders, especially when dealing in complex instruments such as futures or FRAs (Forward Rate Agreements). An existing FRA trading system sold by EBS Dealing Resources Inc has a limit ability to place limit type compound orders. A limit type compound order is a multiple order, for example, in a number of tenors which has an overall limit applied to it which is less than the total value of the orders. In the EBS FRA system, there is an order limit safety net which enables quotes to be cancelled once a limit has been reached.

There is no facility in any of the existing systems for conducting joint execution trades. Those are trades such as simultaneous but and sell order, which must all be executed or the entire deal cancelled.

Without the ability to submit compound orders, traders cannot trade as effectively as anonymous trading systems as they are using conventional methods such as voice brokers. While this is not a major disadvantage for some markets such as F/X Spot, it is a very serious disadvantage when trading other financial instruments. It restricts the usefulness of existing systems and also restricts the spread of anonymous systems into markets which are still run using conventional open outcry methods.

It is, therefore, desirable to be able to provide the ability to handle compound orders in anonymous trading systems beyond the very limited safety net type limit orders presently available on FRA trading systems.

SUMMARY OF THE INVENTION

It is an aim of the invention to provide a trading system which can handle compound orders input by traders.

It is a further aim of the invention to provide a system which can handle joint execution orders.

It is a further aim of the invention to provide a system which can handle a range of limit type orders.

It is a still further aim of the invention to provide a system which can synthesise currency pair prices and permit traders to hit those synthetic prices.

An embodiment of the invention provides an anonymous trading system for trading financial instruments between traders comprising a communications network for transmitting electronic messages. A plurality of trader terminals are connected to the communications network each for generating electronic order messages including bid and/or offer orders and for communication to a trader of order information received from others of said plurality of order input devices, for example trader terminal over the network. One or more matching engines are connected to the network for matching bid and offer orders, input into the system from the trader terminals. The matching engines also execute deals where prices are matched. Market distribution means are connected to the network for distributing order messages to the trader terminals. The market distribution means are responsive to the price quotation messages and the matching engine. A plurality of trader terminal interface means are provided. Each trader terminal interface means has connected thereto trader terminals representing at least one trading floor for communication of visible order messages to a one or more matching engines and for communication of visible order messages and deal information messages to the trader terminals. The trader terminal interface means and the one or more matching engines further comprise means for matching and executing a plurality of linked orders, wherein all of said linked orders are either executed together or rejected.

One embodiment of the invention provides an anonymous trading system for trading instruments between traders comprising a network of order input devices such as trader terminals, a network of brokers, each broker comprising a matching engine for matching bid and offer orders entered into the system and for executing deals where orders are matched. Market distribution means distribute visible order messages to trader terminals. A plurality of trading agents are each connected to a broker and provide an interface between a trading floor of trader terminals and the broker to which the trading agent is connected. At least one trading agent and the broker to which it is connected include means for matching and executing joint execution orders comprising a plurality of linked orders, wherein all of said linked orders are either executed together or rejected.

Embodiments of the invention have the advantage that they allow joint execution orders to be handled by anonymous trading systems. This ability is not provided in prior art systems. This enables anonymous trading systems to be used for more sophisticated transaction types than is at present possible and also assists in making automated or anonymous trading systems viable for trading instruments where compound joint execution orders are commonplace.

In an preferred embodiment of the invention, each of the brokers and trading agents connected thereto include the means for matching and execution joint execution orders.

In a preferred embodiment, the responsibility for handling joint execution orders is divided between the trading agent to which the order is input and the broker to which that trading agent is connected. Joint execution orders are always handled as hits which are not visible to other traders in the system. It is preferred that the hits are persistent such that they remain available for matching if a match is not initially possible.

The trading agent receives a joint execution order from a trader and passes that order to the matching engine or broker in a joint execution order message. This will indicate the orders to the broker and will enable the broker to determine that all parts of the order must be executed jointly. On completion of each part of the order the broker will send to the trading agent a message indicating that the order is executable. The trading agent does not execute the order immediately but waits until all of the separate orders comprising the joint execution order are executable, that is until executable deal messages have been received from the broker for all of the orders. At this point the deals are all completed simultaneously and the joint execution order is logged to the trading agents disk. Prior to deal completion, credit checking may take place at one or both of the trading agent and the broker.

If insufficient credit is available, the entire joint execution order may be cancelled, or if there is sufficient credit only for part of the deal, the entire joint execution order may be reduced to the amount, or in proportion to the amount, of the lowest of the orders that may be completed.

The invention also provides a system and method for providing synthetic dealable prices. Where dealable prices are available for two currency pairs, comprising a first and second currency and a first and third currency, prices may be synthesised for transactions between the second and third currency. Thus, an additional currency pair is synthesised. Traders may input invisible hit orders to hit prices of the synthesised currency pair. The system embodying the invention treats a hit order for a synthesised price as a joint execution compound order and divides it into an order for a transaction in the first of the currency pairs from which the synthetic pair was derived and an order for a transaction in the second currency pair from which the synthetic pair was derived.

According to this aspect of the invention an anonymous trading system is provided for trading synthetic currency pairs between traders comprising a plurality of order input devices, for example trader terminals, a network of matching engines, each matching engine matching bid and offer orders entered into the system and executing deals where bid and offer orders have been matched. Market distribution means distributes information relating to bid and offer orders in the system to the trader terminals. A plurality of trading agents are each connected to one of the matching engines and provides an interface between a trading floor of said trading terminals and the matching engine to which the trading agent is connected. Means are provided for synthesising bid and offer orders for transactions between a pair of currencies having a first currency and a second currency from bid and offer orders entered into the system for transactions between a currency pair having the first currency and the third currency and bid and offer orders entered into the system for transactions between a currency pair having a second currency and a third currency. The system further comprises means at the matching engines and the trading agents connected thereto for matching and executing joint execution orders comprising a plurality of linked orders, wherein all of the linked orders are either executed together or rejected. The trading agents further include means for converting a bid or offer order for a transaction in said synthetic currency pair into a joint execution order comprising an order in each of the pair comprising the first and third currency and the pair comprising the second and third currency.

The ability to synthesise currency pairs has the advantage of improving the flexibility of the system and also of increasing liquidity in given currency pairs.

A further aspect of the invention enables the automated or anonymous trading system to handle limit type orders. According to this aspect of the invention a trading system comprises a plurality of order input devices such as trader terminals and a network of brokers. Each broker comprises a matching engine for matching bid and offer orders entered into the system and for executing deals where prices are matched, and market distribution means for distributing price messages to trader terminals. A plurality of trading agents is provided, each trading agent being connected to a broker and providing an interface between a trading floor of trader terminals and the broker to which the trading agent is connected. The trading agents each further comprise means for entering compound orders comprising a series of bid or offer orders and a deal limit, when the sum of the orders is greater than the deal limit, and the brokers each comprise means for cancelling the orders in the compound order when an amount equal to the deal limit has been executed.

BRIEF DESCRIPTION OF THE DRAWINGS

An embodiment of the invention will now be described, by way of example only, and with reference to the accompanying drawings, in which:

FIG. 8 shows a limit type order;

FIG. 9 shows a limit type order following a number of matches;

FIG. 10 shows a limit type order at its conclusion;

DESCRIPTION OF PREFERRED EMBODIMENT

The present invention will be described with reference to the dealing architecture illustrated in FIGS. 1 to 6 and which will be hereinafter described. However, it should be understood that the invention is not limited to that architecture but could be implemented in any anonymous trading system. For example, it could be implemented on either of the Reuters and EBS Dealing Resources prior art systems known in the art and referred to earlier.

The electronic brokerage system to be described provides a platform for trading at least the following instruments: FX (Foreign Exchange) Spot, FRA's, and Forwards and also FX Forwards, CFDs, short-dated government and/or central bank paper, commercial bills, CDs, inter-bank deposits, commercial paper, repos, interest-rate futures, swaps, options and various tailor-made variants on these basic products. These are all referred to as financial instruments. It may also be used for trading non-financial products such as commodities.

Traders at trader terminals are connected to a communications network which allows electronic messages to be passed between terminals. These messages include the submission of quotes and hits which are then passed on to each of a plurality of broker nodes throughout the system. A quote is a bid or offer order submitted by a trader to "make a market" and is distributed to other traders as part of a market view. Quotes are thus orders visible to other traders. A hit is a buy or sell order submitted by a trader wishing to create a deal on the basis of a price displayed on his market view derived from one or more quotes Hits are orders which are invisible to other traders. Thus trader terminals provide a means for inputting orders into the system. The trader terminals allow traders to input orders manually. A trader may program his terminal automatically to submit an order once the market reaches a given condition. Orders may be submitted automatically from an institutions dealing system.

Figure 1:
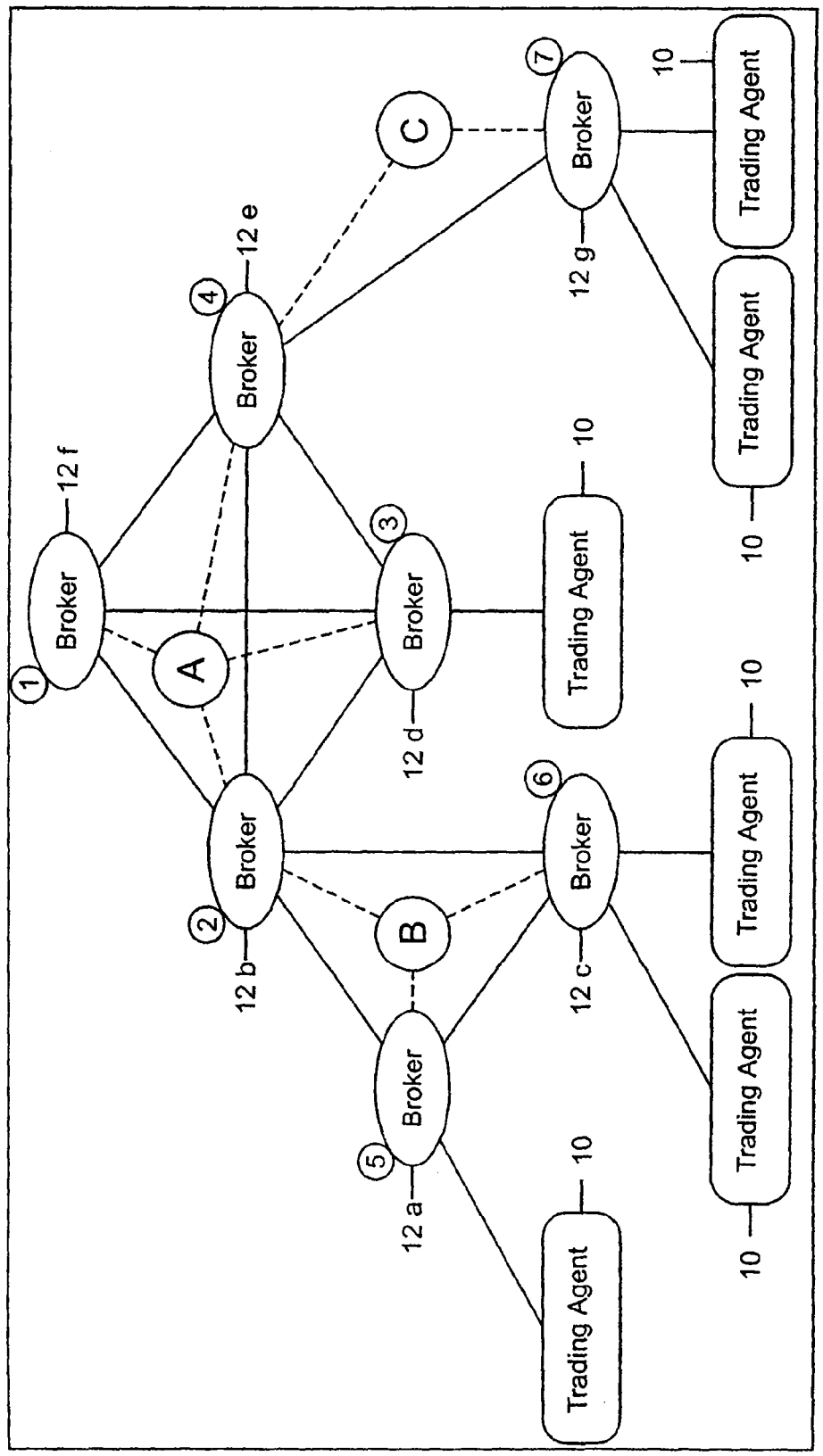
FIG. 1 is an overview of a trading system embodying the invention.

The computer trading system of FIG. 1 comprises a plurality of trading agents 10 each connected to at least one of a plurality of broker nodes 12. Each trading agent is the means by which the trader terminals access the trading system with a given trader terminal being attached to one or more trading agents.

Trader terminals (not shown) may be workstations or other computer terminals configured to generate and submit electronic price quotation messages including bid and/or offer prices, quotes and orders (usually through use of a specialised key pad) and to communicate market view data, including price and amount available, for financial instruments to be traded. The communication is usually by display but could also be by printing the information, voice synthesis or otherwise.

Traders are typically grouped as part of a financial institution, such as a bank, which arranges traders as part of a trading floor. A trading floor is a group of traders under common control of a trading floor administrator who allocates credit lines for the trading floor against other trading floors. The market view for a trader, or group of traders, is the market information (price, volume, etc.) that the traders can see that reflect the market. The market views are preferably pre-screened for credit compatibility, as described in WO93/15467 the contents of which are incorporated herein by reference. Thus, traders only see displayed quotes with which they can trade. As well as extending credit to a trading floor, credit may be extended to a bank as a whole (many banks have several trading floors indifferent locations), or to an individual trader or group of traders. Credit may be extended from the bank as a whole, from a trading floor or from an individual trader. This process will be described in detail later.

The system is an anonymous trading system in which the market views produced by the brokers comprise price and amount information without identifying the source of the price. The prices displayed for available bids and offers and the amounts available at those prices, are thus aggregates of one or more quotes. Only the quotes of parties satisfying the pre-screen credit criteria are included in the aggregate price displayed. The market views produced by the broker nodes thus differ from one trading floor to another depending on the credit allocation.

The trading agent node provides services to a specific trading floor or group of traders. These services include providing access to the network for each trading work station, completing deals, producing deal tickets and maintaining historical dealing information for traders. Each trading agent node must connect to at least one broker node to access the trading system. A group of trader terminals thus connects to a trading agent 10 to access the system.

Each Broker node 12 provides the basic order matching and price distribution services. The Broker nodes are arranged in a structure called a Clique Tree which enables faster communications routing, following very specific but simple rules. The Clique Tree is a network structure where individual nodes are grouped into Cliques, and the Cliques are then arranged into a tree structure. Each Broker can be linked logically to a number of Brokers, which are referred to as its neighbour Brokers. Communication between Brokers is on an equal level, with no "up" or "down" direction in the network.

In the embodiment of FIG. 1, there are three Cliques: that formed by brokers 12a, 12b and 12c, that formed by brokers 12b, 12d, 12e and 12f and that formed by brokers 12e and 12g. It will be seen that brokers 12b and 12e are both in two Cliques. It will be appreciated that, for ease of understanding, only a simple example is illustrated. In practice the network may be very much more complex with a large number of cliques.

While Trading Agents must be connected to at least one Broker node, they are not members of the Clique Tree, but remain outside the structure. A Trading Agent connected to multiple Broker nodes will receive multiple sets of market prices. Even though the price information from different Broker nodes can be substantially the same, the information may be received at different intervals. A Trading Agent will send a given trading order to only one Broker node.

The term Broker node is used to describe a computer arranged as a physical or logical node in a computer network providing a broking function. The basic broking function is the storing of quotes, providing the quotes to traders in the form of a market view and matching quotes and orders. The Broker nodes in the described embodiment also perform further functions, but these are not essential features of what is defined as a Broker node.

Thus, the broker nodes each provide a matching engine which is connected to the network for matching submitted bids and offers and, when a match is made, for executing deals. They also perform the function of market distributors distributing prices messages to the trader terminals in response to the price quotation messages and the matching engine. Within the context of the present invention it is preferred that the matching and market distribution functions are amalgamated in the broking node but the invention is equally applicable to systems in which the functions are separate and performed at geographically and/or logically separate locations. An example of such a system is WO93/15467 referred to earlier.

The Broker nodes are equal to each other, and perform the same functions. The arrangement of the network or their position in it is transparent to the broker nodes. They only need to know about their neighbours. Each Broker node has knowledge of all orders in the market, and is able to match orders as soon as they are submitted. As each Broker node maintains a full list of orders in the market, it is therefore able to customize market views as needed by the Trading Agents and is able to react faster to market information as soon as it is received.

Figure 2:
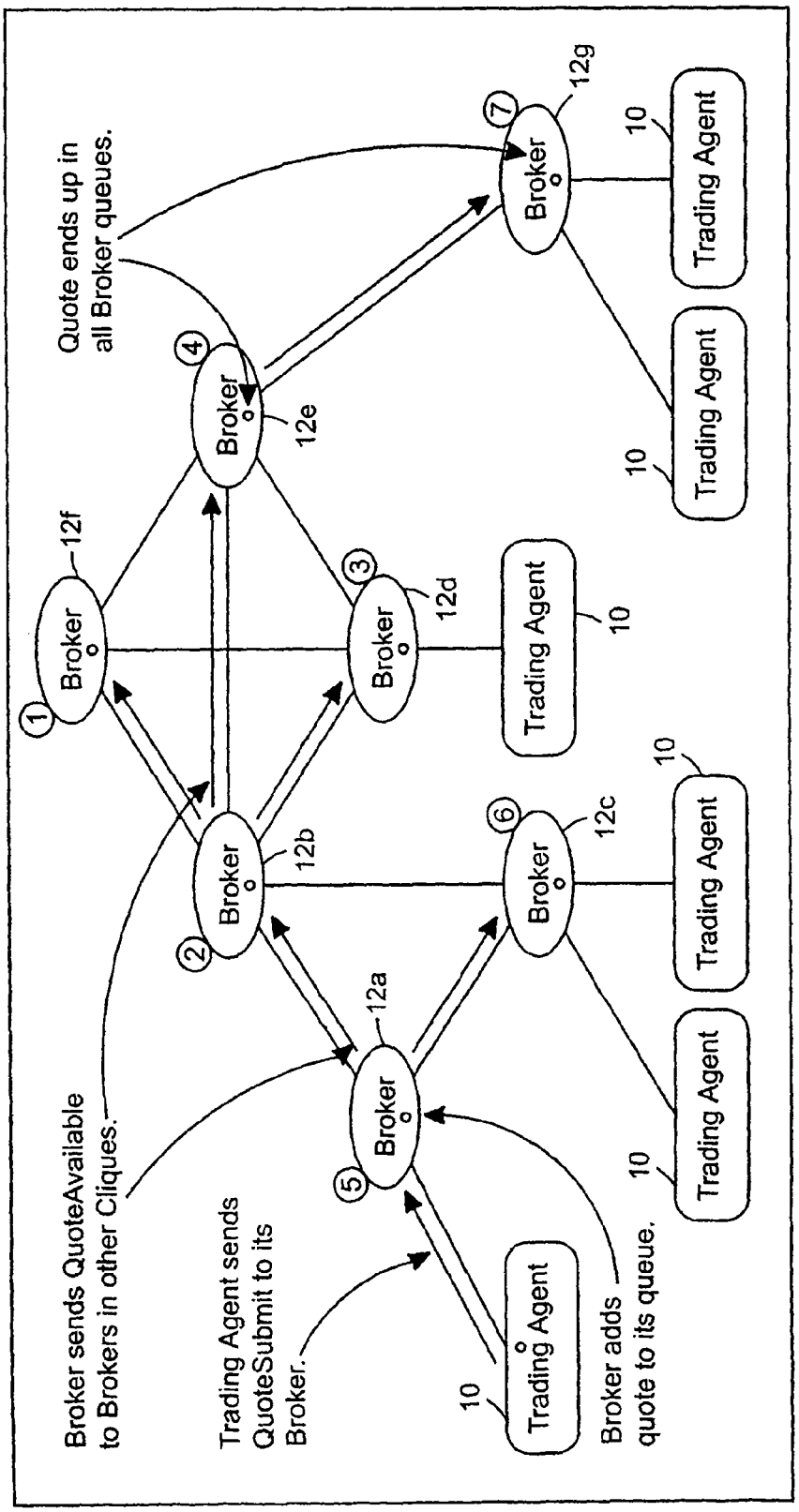
FIG. 2 shows the flow of messages when a new quote is submitted in the system.

To understand the purpose of the distributed broker node arrangement, price distribution and deal execution will now be described with reference to FIG. 2.

The deal process begins with one or more traders submitting orders into trader terminals. An order is a dealing request from a trader, with instructions to buy or sell with specific restrictions, such as price and amount. A quote is a persistent order that remains available in the system and is distributed as part of the market price information. Quotes are used to "make the market", and are known to traders as bids or offers. A hit is an order that has "invisible" and "fill or kill" properties ("invisible"). Hits are not distributed as part of the market price. A hit does not remain in the system; if it can not be dealt when entered, it is removed.

An Order Book is a list of all the available orders in the market. Since the Quotes are the only available orders, the book consists of a list of Quotes. The Quotes are arranged in a queue in the correct dealing order. The sort order of the queue may vary for different trading instruments. The default sort order is by price and time. In the system, each Broker node maintains a complete list of all available quotes. In a system such as foreign exchange there will, effectively, be two books, one showing orders to buy and the other showing orders to sell.

The message flow in the system is described by named messages, each carrying appropriate parameters throughout the network. The process of submitting a quote (persistent order) begins when a Trading Agent receives information from a trader workstation that a trader has issued a bid or offer. The Trading Agent then starts the quote submission process. When the Trading Agent receives the quote information from the trader workstation, it will create and maintain a context for the quote. It will then send a Quote Submit message to the Broker node that it is connected to. The Broker node will validate the quote and accept it if valid. This first Broker node that receives the quote becomes the "owner" Broker node for this quote. In example shown in FIG. 2 this is Broker node 5. This is the only Broker node that can commit the quote to a deal. The Broker node will create a context or "quote object" and sort it into its queue for the correct tradable instrument.

After the quote is placed into its queue, the owner Broker node will then distribute the quote throughout the network by sending QuoteAvailable messages to other Broker nodes. In this example, Broker node 5 sends the QuoteAvailable message to Broker nodes 2 and 6. As each Broker node receives the message, it creates a context (quote object) and sorts it into its queue (order book). It notes in the context which Broker node had sent it the message. After placing it into the queue, the Broker node then sends the QuoteAvailable message on, using broadcast routing rules, to all neighbours except those in the same clique as the broker who sent the message. Therefore, Broker node 2 sends it to 1, 3 and 4. Broker node 4 then sends it to Broker node 7. At this point, all Broker nodes know about the quote, and update their order books accordingly.

The broadcast routing rules are applied to ensure that network traffic is handled in an efficient manner and to reduce any duplication of message flow.

The broadcast rules are:
1. The Broker node originating information will send it to all of its neighbour Broker nodes.
2. A Broker node receiving the information will send it to all of its neighbours Broker nodes except those in the same clique as the Broker node that sent the information.
3. If a message contains persistent information, such as a quote, the information will be stored with the identifier of the Broker node from which the information was received.

Note that these rules refer to the information, not the message that contains it. For example, information about a quote may be sent to one Broker node in a ProposeDeal message and to another Broker node in a MarketUpdate message. However, the same information is sent to both Broker nodes, and so the above rules apply.

Figure 3:
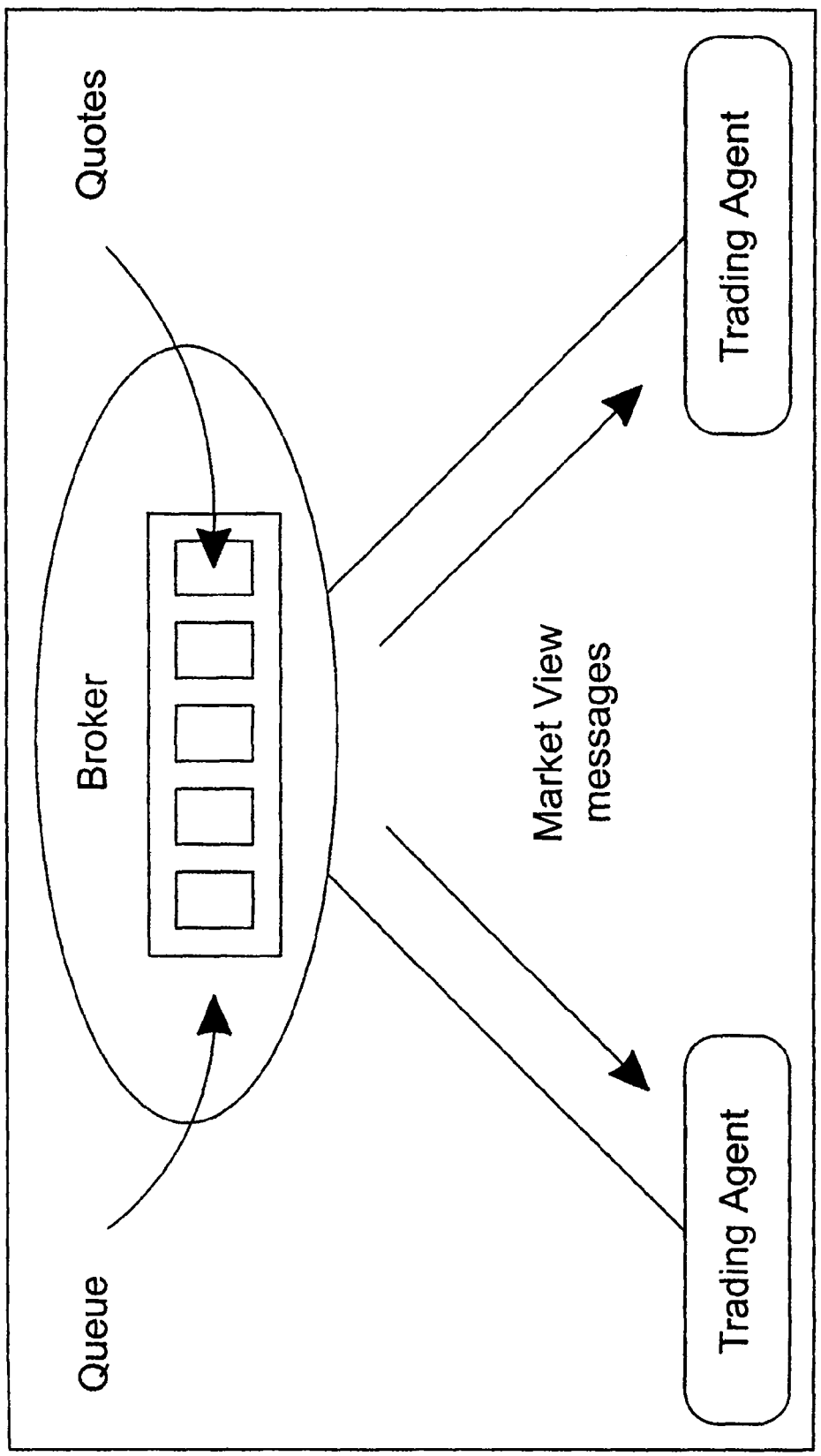
FIG. 3 depicts the production of a market view to traders.
Figure 4:
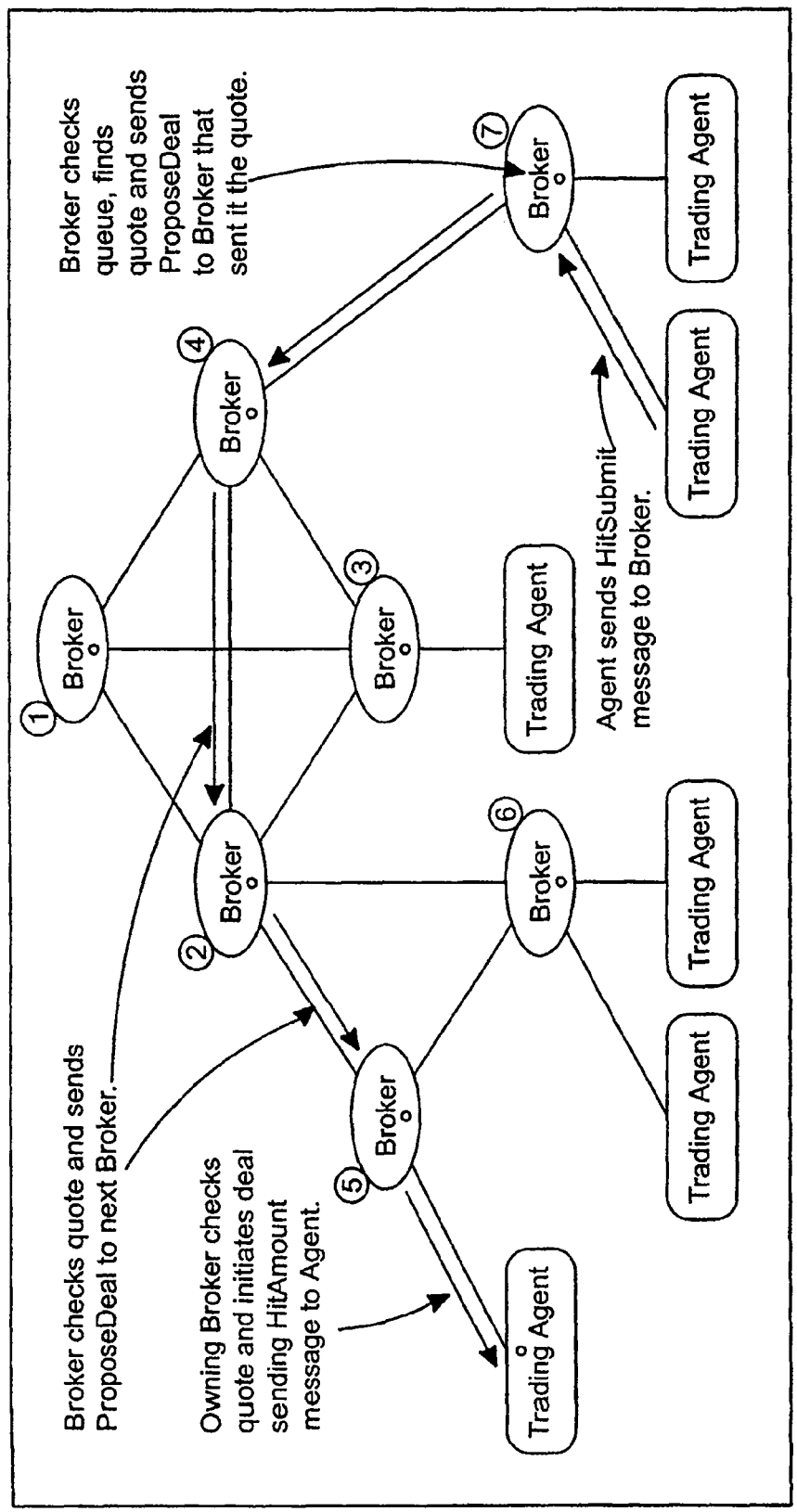
FIG. 4 shows the flow of messages when a trader submits a buy or sell order.

Price distribution is the process of providing market information to the traders at the trader terminals. This information is created by the Broker nodes and sent to the Trading Agents for distribution to the traders. This process is shown in FIG. 3.

Each Broker node will examine its queue of quotes (order book) and calculate a view of the market for each Trading Agent connected to it. This view is built specifically for the trading floor that the agent represents. Views may be different based on credit or other factors. The exact process for determining a market view will vary based on the trading instrument. The view information is sent to the Trading Agent in a MarketView message. It follows, therefore, that each of the brokers hold credit information for each trader and the possible counterparties.

Hitting a quote is the basic process of creating a deal between two traders. A hit from one trader is matched to a quote from another trader. This process is shown in the FIG.

4. The Trading Agent of the trader terminal hitting a price shown on his market view display sends a HitSubmit message to the Broker node. This message targets a price, not a specific quote. The Broker node will scan its queue and find the first quote in the queue that can be matched with the hit. The matching rules may vary based on the trading instrument.

When the hit is matched to a quote, the Broker node will modify its context for the quote, moving the amount matched from "available" to "reserved pending deal". This will prevent the same amount of the quote to be matched with another hit. The Broker node will then send a ProposeDeal message to the Broker node from which it received the quote. This message will target the specific quote. In this example, the hit comes from a trader connected to a trading agent connected to broker 7. Broker 7 will send the message to Broker 4.

As each Broker node receives the ProposeDeal message, it checks the quote in its queue. If the amount of the proposed deal is still available in the queue, the Broker node performs a similar process as the matching Broker node. The amount of the proposed deal is moved from "available" to "reserved pending deal". The ProposeDeal message is then sent to the Broker node from which it received the quote. In the example, Broker node 4 sends it to Broker node 2. Broker node 2 will then send it to Broker node 5.

The routing of a ProposeDeal message follows targeted routing rules. Targeted routing is used to deliver information to a specific Broker node. Since knowledge of specific Broker nodes is not built into the system, the target is not a specific Broker node, but is the Broker node from which the information originated. For example, a message is not sent to "Broker node 714", but is sent as to "the Broker node originating quote 42". The targeted rules are:

1. A Broker node originating a message about a specific piece of information will send the message to the Broker node from which it received the original information.
2. A Broker node receiving a message about a specific piece of information that it did not originate, will send the message to the Broker node from which it received the original information.

The message will thus follow the path of the original information back to its source. In the example this is from Broker node 7, to Broker node 5, via Broker nodes 4 and 2.

When the Broker node that originally created the quote receives the ProposeDeal message, it performs the same checks and amount reservation as the other brokers. Since this Broker node owns the quote, it has the authority to commit the quote to a deal. The ProposeDeal message represents the authority to commit the hit to the deal. The Broker node will then initiate the deal process by sending a HitAmount message to the Trading Agent that submitted the quote. The deal execution process is described later.

Figure 5:
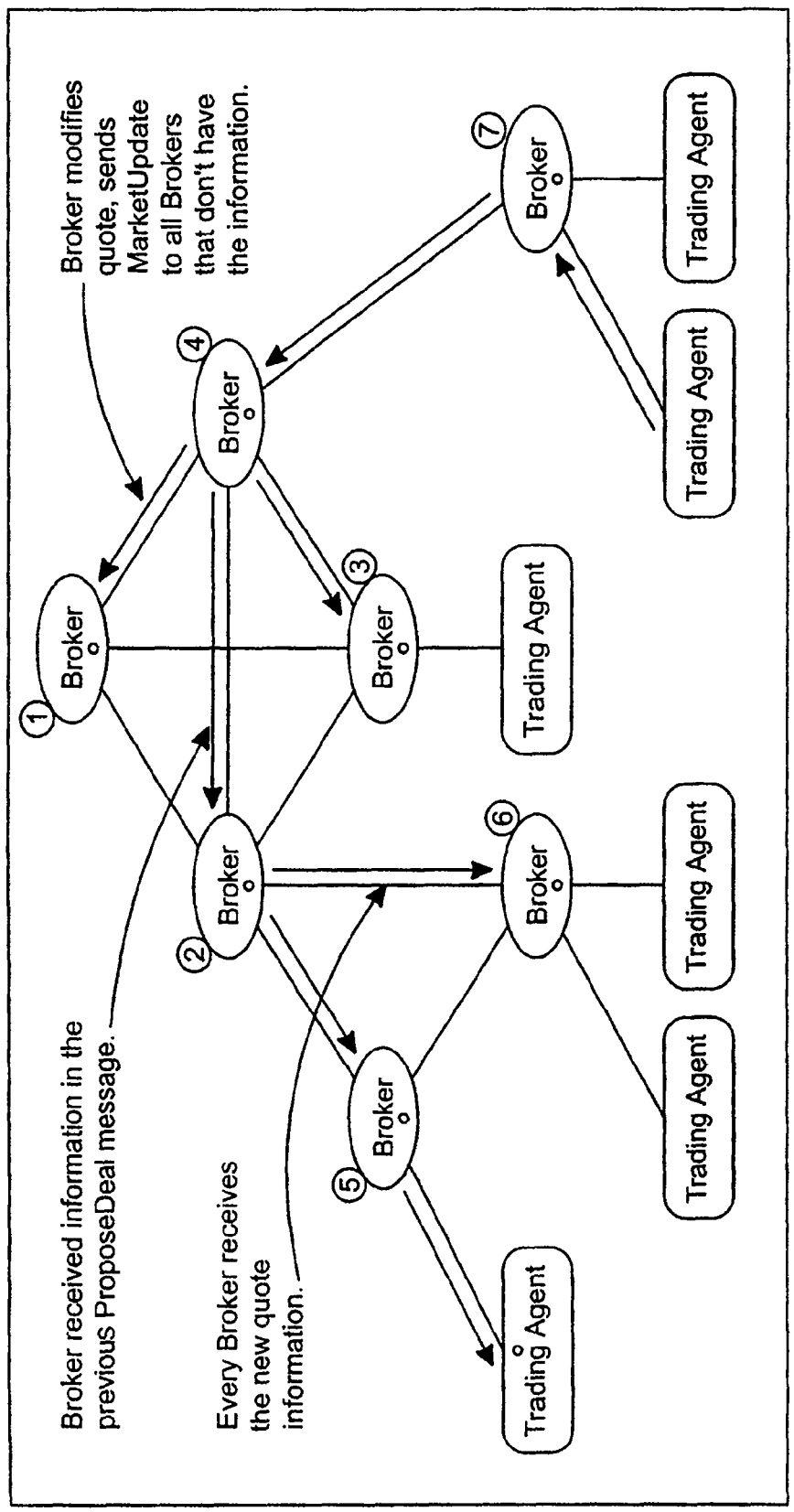
FIG. 5 shows the flow of messages to update broker nodes following a buy or sell order.
Figure 6:
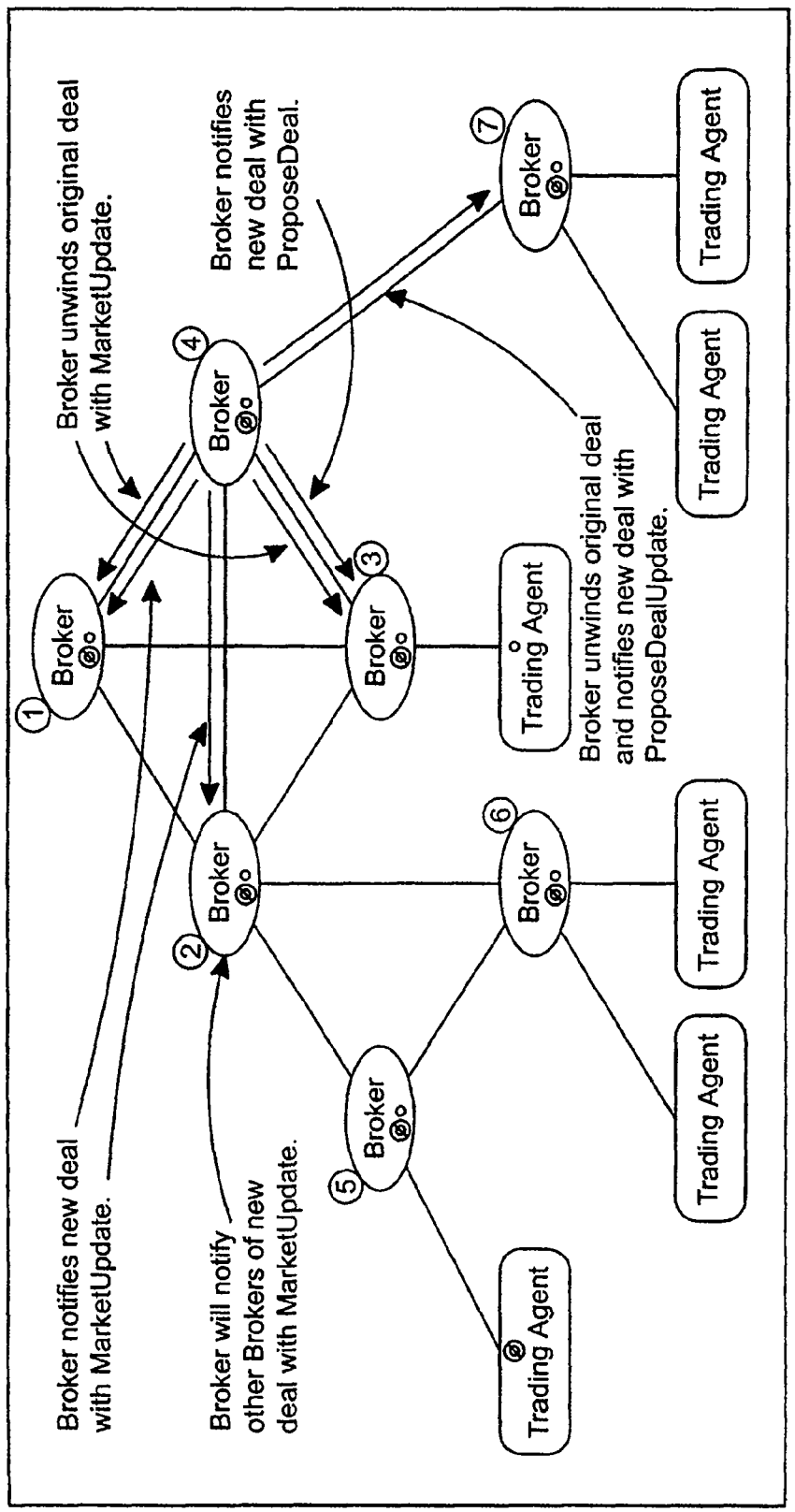
FIG. 6 shows the flow of messages when a broker modifies a quote.

As the deal matching process takes place, it is necessary that the list of quotes maintained at each Broker node be keep up to date. This is accomplished by each Broker node notifying others when it makes a change to a quote, as shown in FIG. 5.

As each Broker node changes a quote in its queue, it notifies all neighbour Broker nodes except those in the clique from which it received the change. In the example above, Broker node 4 received notice of a change in a quote from Broker node 7 in a ProposeDeal message. It notifies Broker node 2 by sending the ProposeDeal message. Broker node 4 must now notify Broker nodes 1 and 3. This is done by sending a MarketUpdate message to these Broker nodes.

Following the normal routing rules, the information about the quote is distributed to each Broker node in the network. Any Broker node receiving the MarketUpdate message will pass it to all neighbours not in the clique from which it is received. Note that a Broker node sending a ProposeDeal message should not also send a MarketUpdate message to the same Broker node. This would result in duplicate information being received and the deal amount being reserved twice.

Figure 7:
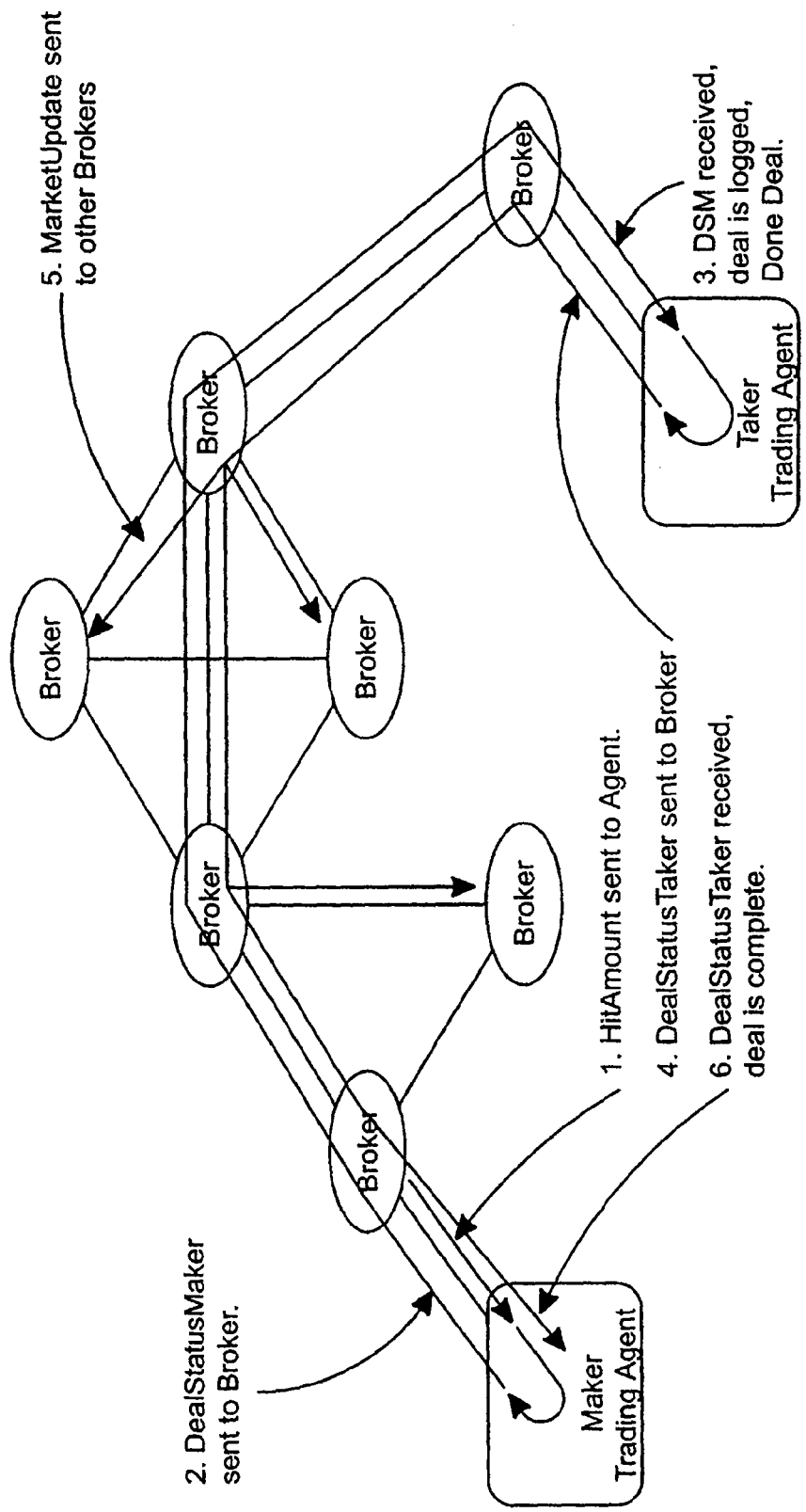
FIG. 7 shows the deal execution process.

When the deal matching process is completed, as described above, the deal execution process begins. This process completes the deal and commits the traders to a deal. The process is shown in FIG. 7. As matches are made and deals initiated, information is made available for traders. This information can be used to inform a trader that a deal is pending. Any given trading application can decide if the trader should be informed. In any case, the information is available.

The Taker's Trading Agent will be notified as soon as the initial match is made and the ProposeDeal message is sent. This agent can notify the traders workstation at this time. This pending deal information may change as the matching process continues. The maker workstation is notified of the pending deal when the maker's Trading Agent checks credit and sends the DealStatusMaker message.

The deal execution process begins when the maker's Trading Agent receives a HitAmount message from its Broker node. This message informs the Agent that a match was made for one of its quotes. The message identifies the quote as well as the amount of the hit, counterparty and the identity of the hit. The Agent will check with the trader workstation to make sure that the quote is still available. The Agent will send a HitAmountWS message to the workstation. The workstation will reply with a HitAmountWK message to show that the workstation is still working and that the trader did not interrupt the quote. At this point, the trader can no longer interrupt the deal.

The Trading Agent will next check for available credit with the counterparty. The credit check may allow the deal, reduce the amount of the deal or disallow the deal. The Agent will then reduce the available credit by the amount needed for the deal. This reduction in available credit may affect future deals. The maker's Trading Agent will now inform the taker's Trading Agent of the deal by sending a DealStatusMaker message to its Broker node. The message is targeted to the identity of the hit. The network Broker nodes will route the message to the owner Broker node of the hit, and that Broker node will deliver it to the taker's Agent. Once this message is sent, the maker's Agent knows that a deal may have been done, but the deal is in doubt pending a reply. The taker's Trading Agent completes the deal execution process. This part of the process takes place when the Agent receives the DealStatusMaker message from the maker. If the message shows a valid deal, the process continues.

The taker's Trading Agent will next check for available credit with the counterparty in a similar manner as the maker. The credit check may allow the deal, reduce the amount of the deal or disallow the deal. The Agent will then reduce the available credit by the amount needed for the deal. This reduction in available credit may affect future deals. It should be remembered that deals are unlikely to be rejected at this stage as prices shown to traders are pre-screened for credit. The taker's Trading Agent will now log the deal to its disk. As soon as the information is committed to persistent storage, the deal is done. Any checks on the deal status will now show a binding deal. The agent will now notify the trader, print a deal ticket and perform any other post deal processing. At this point, the deal is done but the maker doesn't yet know. As soon as the deal is done, the taker's Trading Agent will notify the maker by sending a DealStatusTaker message to its Broker node. This message is targeted to the quote and will be routed to the maker's Agent.

The DealStatusTaker message contains final information about the deal, and therefore the final changes to the quote. This information is used by the network Broker nodes and the Trading Agent. As the DealStatusTaker message is routed through the Broker nodes, each routing Broker node will use the information to update its quote context. The amount of the deal is moved from "reserved" to "complete". The portion not done is moved from "reserved" to "available" if the quote is still active. It will then notify other Broker nodes of the changes and of the deal by sending a MarketUpdate message to all other Broker nodes using network routing rules.

When the DealStatusTaker message gets to the owner Broker node of the quote, it will send it to the Trading Agent. The Agent will record the deal to disk. At this point the deal is no longer in doubt. The Agent will notify the trader, print a ticket and perform any other processing that is required. Some trading instruments may require additional information to be exchanged for a deal. An example of this is the settlement instructions for EBS spot F/X. This type of information is sent in a DealInformation message. After the deal is processed, the Agents can develop this information. The DealInformation message is sent to the Broker node. The network Broker nodes will then route the message to the other Agent where the information is processed as required by the instrument. A deal is thus completed.

Once the deal is complete, the two parties will know the identity of their respective counterparty for the first time. The identity will be displayed on their terminal screen and shown, for example, in a listing of deals performed in that trading session as well as printed on the deal ticket and logged to disk. Each of these comprises a means for identifying to each of the parties to an executed deal the counterparty to the deal.

The manner in which credit is handled in the system described will now be considered in more detail.

As mentioned previously, the system screens prices and matched deals using credit, as a result of which all prices shown to a dealer should be available for trading. It will be understood from the foregoing description that this requires each broker to have sufficient credit information to be able to make credit decisions. This is because the broker nodes are responsible for forming the market view which is distributed to communicating trading agents. The actual credit data is very complex and can vary by product and institution. For example, the concept of credit in an F/X trading system is straightforward as it is a spot market. However, for a product such as FRAs it is more complex as deals are done over a variety of time periods. In addition, some banks may prefer to assign credit to a counterparty over the whole of the range of their trading activities whereas some banks will prefer to assign credit to counterparties for a given financial instrument.

To simplify the process the system distributes and uses a simple subset of the credit data. Final credit authority remains with a node that has the full credit information. In the present system this will be the banks trading agent node but this is not mandatory and the invention is equally applicable to systems where credit is stored off site.

The system uses a single numeric value for each combination of trading floor, counterparty trading floor and tradable element. The purpose of the numerical value is to determine whether the two floors have credit to deal in a particular element. The meaning of the numerical value is specific to the instrument being traded. For example, spot F/X uses the value as a yes/no flag (1 or 0) whereas in Forward Rate Agreements (FRA) the value is used as a bit mask for FRABBDA/ISDA decisions. Other instruments will have other meanings. The credit is bi-lateral. Credit must exist between two floors for any dealing activity to take place. The credit check is made for a given trading element or pattern of trading elements as determined by the instrument. As the system is bilateral the broker will compare two credit values; that given by the first floor to the second and that given by the second floor to the first. If the values are compatible, the dealing operation is allowed. The meaning of compatible will be determined by the instrument. In terms of spot F/X if the amount proposed for the trade is lower or equal to the lowest of the two credit values the deal can proceed. Even if the deal is greater than the lowest credit value it may still proceed but only for a part of the proposed deal amount equal to the lowest credit value.

The full credit information for a trading floor is originated for a trading agent that has credit authority for a trading floor. This agent only has part of the total information; that relating to its own trading floor although it is possible that more that one trading floor is connected to a Trading Agent. When the credit information changes, the Trading Agent will sent a CreditUpdate message to its broker. The broker will combine the information from the Agent into its total credit matrix and pass the message to neighbour brokers as a broadcast message following the rules set out earlier. Each broker will also store a record of from where the credit information for a given floor came from.

In the prior art system described in WO93/15467 the bank node holds the credit authority for a floor and is also responsible for dealing activity for the floor. The deal execution process described earlier is based on this credit model which is known as local credit.

During the deal execution the Trading Agent is presented with a potential deal. The Agent will examine the details of the deal and determine how much credit is required to complete the deal. It will check the available credit and, if it is insufficient, the Agent may reduce the amount of the deal or disallow the deal. The amount of credit actually needed (the whole or reduced amount) is reserved from the pool of available credit. This credit is not available for other deals. If this reduces the available credit for other deals below the dealing threshold the Agent will send a CreditUpdate message to notify the broker that credit is no longer available.

When the deal is completed, the maker's Agent will be notified with a DealStatusTaker message. The Taker's Agent will then be aware of the completed deal. The Agent will then determine the credit that was actually used by the deal. This credit will be removed from the credit pool as consumed credit. Any remaining amount from the original reservation will be returned to the original pool.

The system has been described so far in respect of the matching and execution of simple orders. That is orders where a single order only is executed. The system may be used to allow compound orders to be completed. A compound order is one where the execution of one order has an effect on or is affected by one or more other orders of the same party. There are two basic types of compound orders; limit type orders and joint execution orders.

Limit type orders are used to allow traders to explore or attempt to deal in more than one area of the market while limiting exposure. An example of this type of order is a FRA (forward rate agreement) order limit. In a FRA order limit a trader can bid in more than one tenor with a single dealable amount that may be matched in any one of the tenors with protection against dealing more than that amount. This order type, whilst limiting the traders exposure, also adds liquidity into the market. Limit type orders are distinguished from market limit orders which are a type of conditional order and will be described later.

Limit type compound orders may be applied to any type of order. Quotes and hits (persistent and fill or kill) as well as visible and invisible orders may be combined into limit type compound orders. Within the trading system described, each of the limited orders stands alone in the price distribution and deal execution process but the limits are applied by the system during the matching process.

The following example shows how limit type compound orders are handles by the system.

Consider the case where a trader submits three bids for three different FRA tenors as a compound order with an order limit of 100. The orders are entered as shown in FIG. 8.

The inclusion of a limit row ensures that the order is not interpreted as a combined order for up to 300.

Application of the limit is performed by the owning broker, that is the broker to which the trader trading agent node is connected. Each order has its own available, reserved and done amounts. As deals are matched, the amount of the deal is moved from available to reserved. As a deal is completed the amount is moved from reserved to done. As an amount is moved from available on any order, the same amount is moved from the limit. Thus, the limit will keep track of the total amounts reserved and done for all the orders.

Returning to the example above, suppose a deal for 400 is matched for Order 1 and is executed. Two deals are matched for 20 each for Order 2. One of these is completed and the other is still pending. The order table is now as shown in FIG. 9

As the amounts of the limit available for trading changes, so the amounts distributed to other traders across the system also changes. Thus, if a quote has an available amount of 100, but its associated limit has an available amount of 20, the order is limited to 20. When the limit is zero the orders are no longer available. If deals fail to be executed, for example, due to lack of credit, reserved amounts may move back to being available and all orders move back to the higher amount, that is they are incremented by the amount reserved. When the total amount of the limit moves to done, that is when the limit order is wholly met, the associated orders are done.

Thus, in the example above, Order 1 is hit for 20 and both this deal and the pending Order 2 deal complete. The compound order is then completely done and the order results are as shown in FIG. 10.

The handling of joint execution orders is more complex than limit type compound orders. Joint execution orders require two or more single orders to be executed together for the same, or a potential, amount. It requires action not only by the broker but also by the trading agent. Not all order types can be executed jointly and all orders that make up a joint execution order must be hits. As hits are invisible orders, prices cannot be distributed to the market since the individual orders cannot be hit. The orders may, however, be persistent. Moreover, the orders may only be matched by the taker's broker, that is the broker to which the taker's trading agent is connected. The taker, as the orders are hit orders, is the trader who places the order on the system.

When a compound order is entered, the taker's broker first examines its list of available quotes for any available matches in the manner described previously. However, the hit will only be matched if all parts of the compound order can be matched. Thus, if the compound order contains three orders, the list will only be matched if all three orders can be matched with available quotes by the broker. If matches are available for all the orders the quotes are matched and the broker sends the ProposeDeal message to the appropriate brokers in the manner described. Pending deals now exists for all these matches.

Deal Processing is performed in the usual manner described until the DealStatusMaker or DealCreditTaker messages are received by the taker trading agent. Once the credit checking procedure has been completed all that is required to complete the deal is for the trading agent to log the deal to disk. However, this is not done immediately for each deal forming part of the compound order. The agent holds the deals until all the deal messages have been received and the deals have passed the credit checking process. The trading agent then adjusts the amounts to the deals to be the same, or correct proportional amount. This is necessary, if, for example, there is sufficient credit with the counterparty to one leg of the deal only to fulfill part of the amount hit. As the deals are all limited, they must all be reduced to this amount.

At this point, with the amounts corrected, the taker agent logs all the deals to disk together. This is a simultaneous operation and completes all the deals. The counterparties are then each notified by sending DealStatusTaker messages in accordance with the procedure described earlier. The remaining message flow is identical to a conventional deal.

Conventionally, hits are not persistent orders. That is, if a hit is received by the broker and no quote is available to match it, it is returned as missed and is not available for later matches—it does not persist in the market. It is preferred that hits which form compound orders are made persistent. This has the advantage of increasing the likelihood that a compound order can be met. In order to make compound hits persistent, the system needs to be able to distinguish them from conventional non-persisting hits. This may be done by requiring hits to be marked "fill or kill", in which case they will not persist and will not be retained by the broker. A hit not so marked is retained and can be matched to new quotes received by the broker. Persistent hits are still invisible orders and are not distributed beyond the taker's broker. Of course, instead of treating hits as persistent unless marked otherwise, the system could treat hits as fill or kill.

FIGS. 11 to 14 illustrate the joint execution order process in more detail. The example to be described is a FRA switch transaction which is a simultaneous buy for a tenor and sell for another tenor. Both legs of the order must be fulfilled otherwise the order will fail completely.

Figure 11:
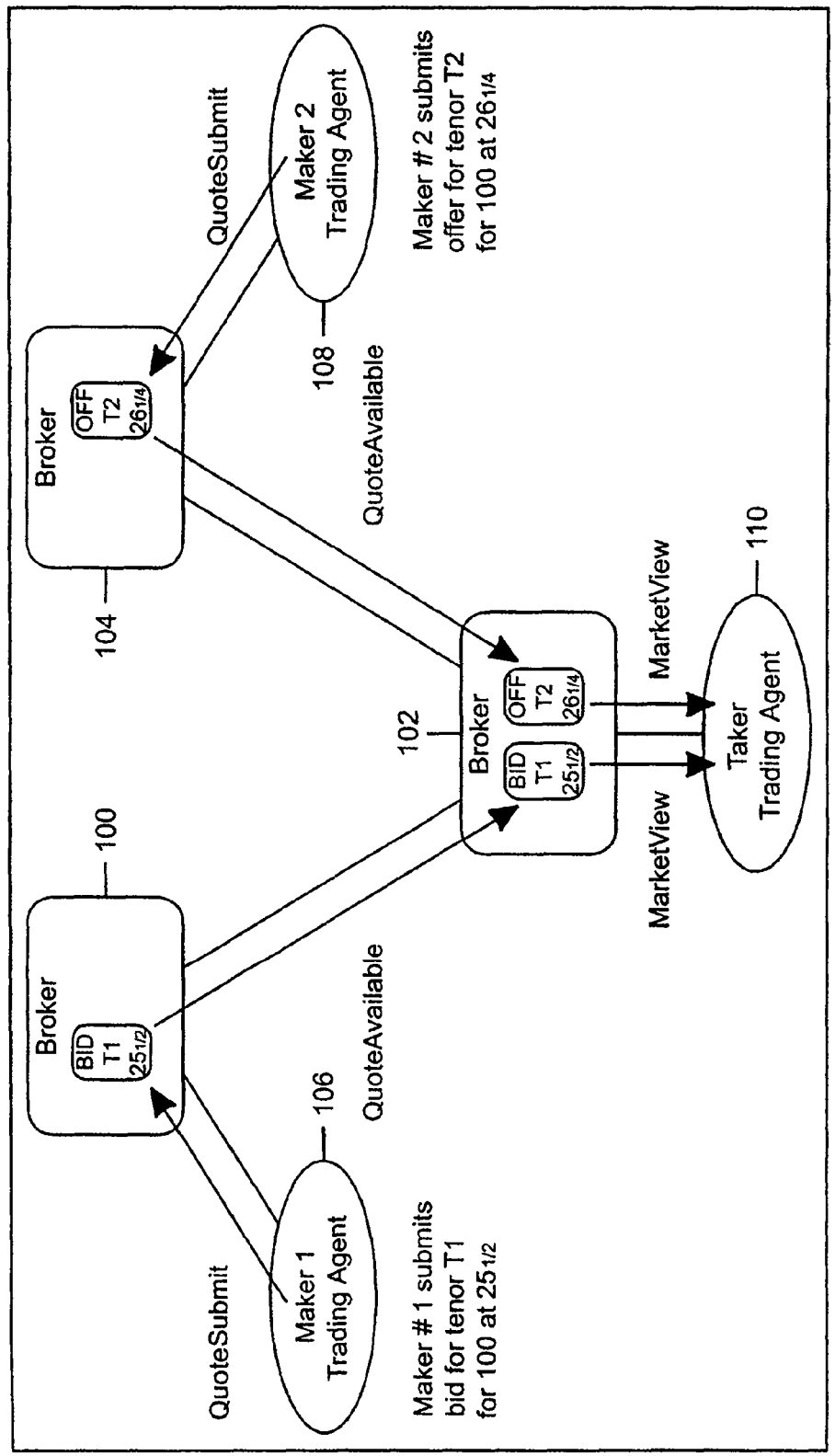
FIG. 11 shows the submission of a joint execution order.

FIG. 11 shows three brokers 100, 102, 104 in the network. In practice there will be many brokers in the network. Broker 100 is the first maker's broker and is connected to the maker's trading agent 106, and to broker 102. Broker 104 is the second maker's broker and is connected to the second maker's trading agent 108 and to broker 102. Broker 102 is the taker's broker and is connected to both the first and second brokers 100,104 and to the taker's trading agent 110.

Initially, the relevant quotes must be entered into the system. These are visible persistent orders. The first maker enters a bid for tenor T1, with an amount of 100 at a price of 25½. This bid is received from the trader by the first maker's trading agent 106 and is passed to the first maker's broker 100 as a quote submit message. The broker puts this quote into its queue and notified the other brokers in a quote available message which is broadcast through the system in accordance with the broadcast routing rules described previously.

Similarly, the second maker enters an offer for tenor T2, with the same amount of 100 and a price of 26¼. This quote is received by the second maker's trading agent 108 and passed to the second maker's broker 104 as a quote submit message. The quote is placed in the second maker's broker's queue and made known to the market through a quote available message.

The taker is made available of the bid and offer quotes by MarketView messages sent by the taker's broker 102 to the takers trading agent 110. This assumes that this taker has credit with both of the makers so that neither of the quotes has been filtered out by the pre-screen credit checking procedure.

The taker trader now sees a bid and an offer and wants to submit a compound order to hit both quotes. This is two separate deals with two different counterparties but the taker does not want either of the deals on their own. If both legs of his order cannot be fulfilled the order must fail, or both legs must be completed for the same reduced amount.

Figure 12:
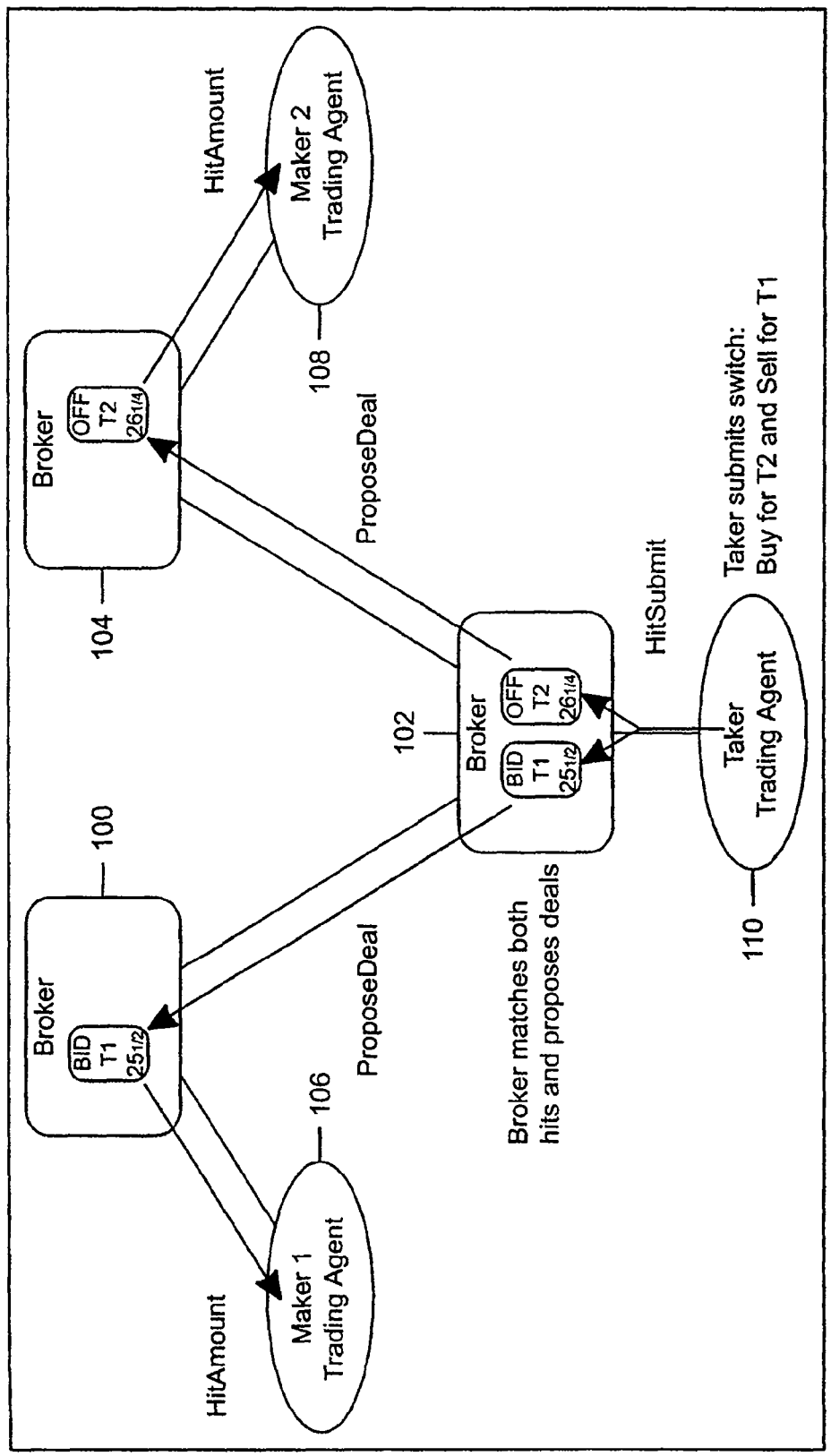
FIG. 12 shows the message flow in a joint execution order when both legs are matched.

The taker then submits an order for the switch transaction for an amount of 100 between tenors T1 and T2. The workstations converts this order to a compound order consisting of a buy for tenor T2 for 100 at a price of 26¼ and a sell for tenor T1 with an amount of 100 and a price of 25½. This order is submitted as a hit order as mentioned previously. FIG. 12 shows how the hits are submitted. The switch order is submitted to the Taker Trading Agent 110 which sends a hit submit message for each of the prices to the taker broker 102. The Hitsubmit message identifies the prices to be hit and as the message contains details of more than one price it is interpreted by the broker as a compound order with prices to be hit linked such that both must be matched. The broker 102 must therefore find quotes to match both sides of the order. In the FIG. 11 to 14 example, one side of the order is matched with the quote from maker 1 and the other side is matched with the quote from taker 2. The broker modifies the quotes by marking the amount 100 as required, in this case that is the full amount of both quotes. The broker 102 then notifies the trading agent 110 of the pending deals and sends a PropseDeal message with a hit for 100 to each of the first and second maker brokers 100, 104. The two maker brokers 100, 104, in receipt of the ProposeDeal message first check to see whether the quotes are still available. If they are then each accepts the match and marks the quotes as reserved. They then notify their respective trading agents 106, 108 by sending a HitAmount message.

Figure 13:
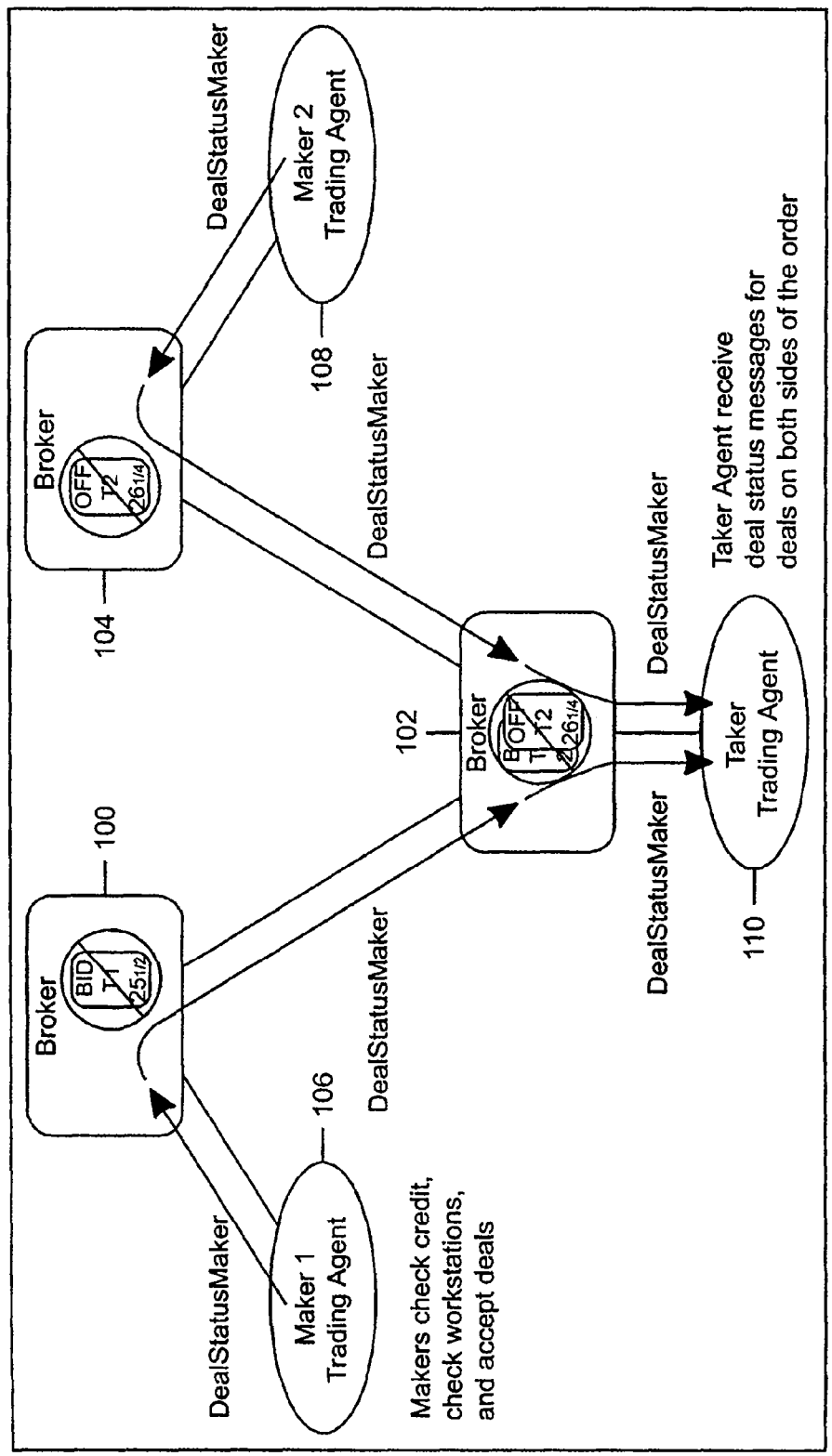
FIG. 13 shows the message flow during execution of a joint execution order.

Referring now to FIG. 13, the deal execution process can now take place. Deal execution for each of the orders is essentially the same as for a conventional style order, as described previously. Each of the maker agents checks credit and ensures that the quote is still active. A DealStatusMaker message is sent to the maker's broker 100, 104 and these messages are sent via the taker's broker 102 to the taker's trading agent 110. When the taker's trading agent receives a DealStatusMaker message it checks credit for the deal. If the deal can be done it will not complete the deal as it is aware that the order is a compound order. The deal is held pending receipt of the second DealStatusMaker message. Once that deal has been checked for credit the taker trading agent 102, now has the deal status for both deals. The trading agent 102 can now declare both deals as done and can log the deals to disk in a simple operation. Both deals are now complete.

Figure 14:
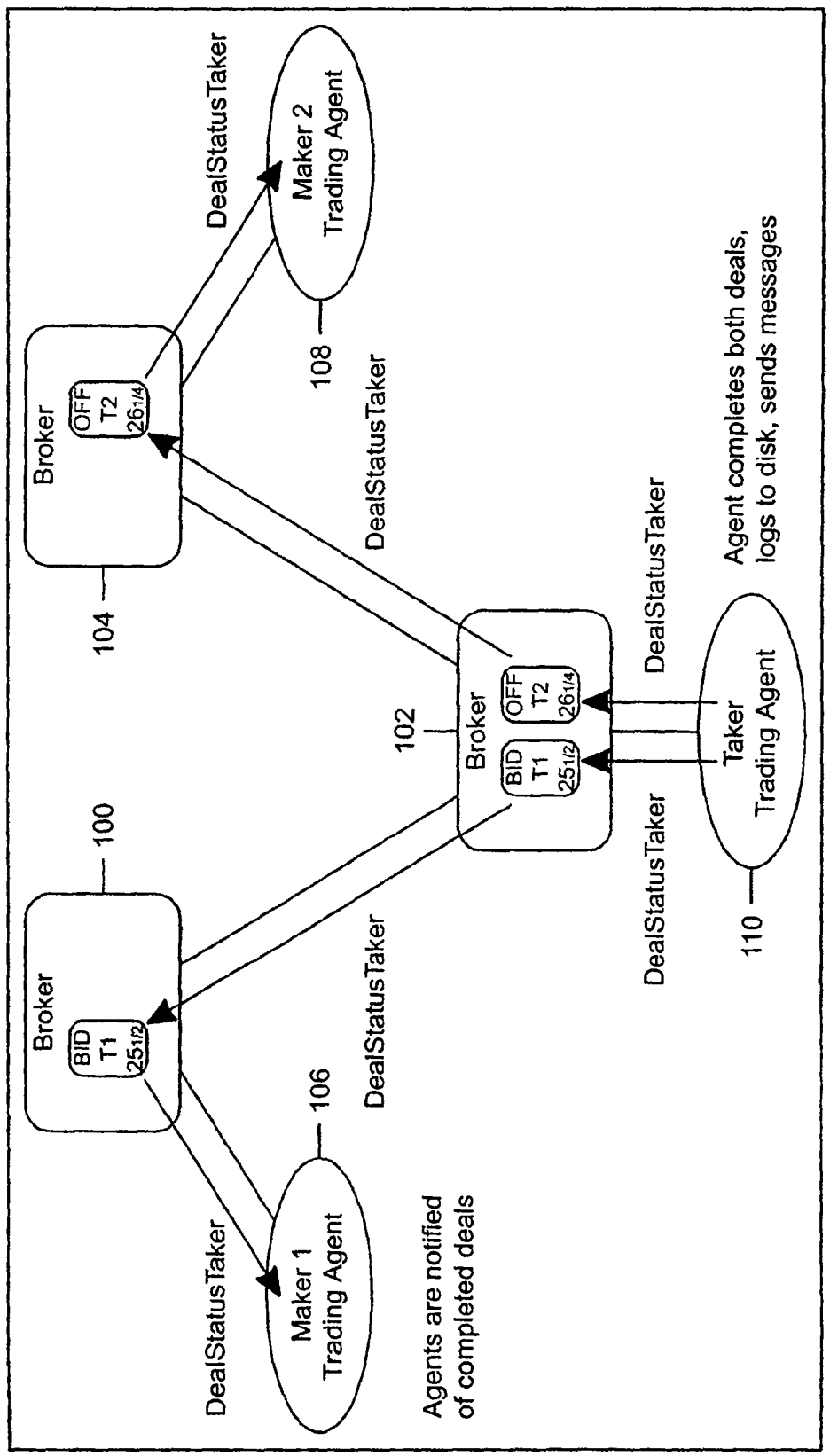
FIG. 14 shows the message flow at the completion of a joint execution order.

The taker trading agent then sends a DealStatusTaker message to each of the maker trading agents 106 108 via the taker broker 102 and the maker brokers 100, 104. This message flow is shown in FIG. 14.

It will be appreciated that the taker side only is aware that the order is a compound order. The taker trading agent is aware that the order is a compound order and that it must not complete either deal until it knows that they both can be completed. Similarly, the taker broker can tell from the HitSubmit message that the order is compound. It requires this information so that it knows that is must find matches for all the parts of the order.

In the example given, both the quotes hit were for the same amount which was the fill amount of the order. It may happen that one of the quotes hit is for less than the full amount in which case the taker trading agent, when it has received both the DealStatusMaker messages will see that one deal is for an amount greater than the other. It will then reduce the amount of the larger deal to that of the smaller deal.

Conditional orders may be handled in the same manner as compound orders. Conditional orders have some external conditions applied to them that must be satisfied before the order becomes valid. One example of a conditional order is a "stop loss" market order in which an order is submitted but does not become active until a certain condition is met, for example, the market has fallen to a certain trigger point. At that time, the quote becomes active and is put into the dealing queue. It will be appreciated that conditional orders are treated as a type of limit order and so may be input into the system as quote or hit type orders.

The joint execution order apparatus and method described may by utilised to synthesise additional prices which a trader can trade with. An example of this is in the foreign exchange spot market. Existing systems trade currency pairs on the basis of quotes input into the system for those currency pairs. However, in accordance with embodiments of this aspect of the invention, traders can be offered additional currency pairs. For example, a Dollar:Yen market may be synthesised from Dollar:Euro and Euro:Yen price information. The trader trading these prices will not be able to distinguish between a synthetic price and a "real" price. However, the manner in which a synthetic price deal is performed is markedly different. To a trader, a synthetic price can be hit in the same way as a conventional price. However, the broking system must treat a list on a synthetic price as a joint execution order. In the example given, if a trader lists a Dollar:Yen price, the system must execute both a Dollar:Euro and a Euro:Yen deal for the price to be dealt. It follows that synthetic prices may only be hit as they are joint execution orders within the system. Traders cannot enter quotes for synthetic prices. Indeed, as soon as quotes were entered, the prices would ceases to be synthetic.

The handling of a synthetic price trade is essentially the same as the joint execution order described previously. The only different is that the trader submits a simple hit order into the system. The taker trading agent will identify this as a hit for a synthetic price and will convert the hit into a compound order consisting of a buy order for one of the currency pairs involved in the synthesis and a sell order for the other currency pair. The HitSubmit message sent to the taker broker is formed in the same way as in the example, given previously, and is identified by the taker as a joint execution order requiring both legs of the order to be fulfilled.

The ability to be able to synthesise prices is extremely advantageous as it enables a wider range of currency pairs to be traded and introduces greater liquidity into the system which, in turn, makes the system more attractive to traders as there is a greater likelihood of trades being completed with a greater liquidity in the market.

The compound order processes described may be adapted for a wide variety of trades and financial instrument types and the invention is not limited to the specific examples that have been described.

What is claimed is:

1. A computer system for trading synthesized currency pairs between traders, the computer system comprising:
   a plurality of order input devices, at least one of said order input devices for entering into the computer system a joint execution order comprising two or more linked orders;
   means for synthesizing bid and offer orders for transactions between a pair of currencies forming a synthetic currency pair having a first currency and a second currency from bid and offer orders entered into the computer system for transactions between a currency pair comprising the first currency and a third currency and bid and offer orders entered into the computer system for transactions between a currency pair comprising the second currency and the third currency;

means for matching and executing joint execution orders, the means for matching and executing performing only one of:

executing, as separate trades, all of the linked orders of the joint execution order; and rejecting all of the linked orders of the joint execution order, and wherein;

the computer system further includes means for converting a bid or offer order in said synthetic currency pair into a joint execution order comprising an order in each of said currency pair comprising the first and third currency and said currency pair comprising the second and third currency.

2. The computer system according to claim 1, wherein the computer system is an anonymous trading system.

3. The computer system according to claim 1, wherein said bid or offer order in said synthetic currency pair is an invisible order.

4. The computer system according to claim 3, wherein said bid or offer orders in said synthetic currency pair is a persistent order.

5. The computer system according to claim 1, further comprising at least one matching engine for matching bid and offers order entered into the computer system and assisting in the execution of deals where bid and offer orders have been matched.

6. The computer system according to claim 5, further comprising at least one broker, at least one of the at least one brokers comprising a matching engine, for matching bid and offer orders entered into the system and assisting in the execution of deals where bid and offer orders have been matched.

7. The computer system according to claim 5, further comprising market distribution means for distributing information relating to bid and offer orders in the computer system to the trader terminals.

8. The computer system according to claim 7, further comprising an interface between trading floors each having one or more of the order input devices and the matching engines.

9. The computer system according to claim 7, further comprising a plurality of trading agents, each of said plurality of trading agents being connected to one of the at least one matching engines and providing an interface between a trading floor and said plurality of order input devices and the matching engine to which the trading agent is connected.

10. The computer system according to claim 9, wherein the means for matching and executing joint execution orders is located at the at least one matching engine and at the trading agents connected thereto.

11. The computer system according to claim 7, wherein the means for matching and executing joint execution orders is located at the at least one matching engine.

12. The computer system according to claim 11, wherein the means for matching and executing joint execution orders is also located at the interface.

13. The computer system according to claim 5, comprising a plurality of matching engines arranged in a network.

14. The computer system according to claim 6, comprising a plurality of brokers arranged in a network.

15. A computer system for trading synthesized currency pairs between traders, the computer system comprising:

means for synthesizing bid and offer orders for transactions between a pair of currencies forming a synthetic currency pair having a first currency and a second currency from bid and offer orders entered into the computer system for transactions between a currency pair comprising the first currency and a third currency and bid and offer orders entered into the computer system for transactions between a currency pair comprising the second currency and the third currency;

means for matching and executing joint execution orders, the means for matching and executing performing only one of:

executing, as separate trades, all linked orders of a joint execution order entered into the computer system; and rejecting all linked orders of a joint execution order entered into the computer system, and wherein;

the computer system further includes means for converting a bid or offer order in said synthetic currency pair into a joint execution order comprising an order in each of said currency pair comprising the first and third currency and said currency pair comprising the second and third currency.

16. A method, on a computerized system having one or more computers on a network, of trading synthesized currency pairs between traders on the computerized system, the method comprising:

at least one of the one or more computers synthesizing bid and offer orders for transactions between a pair of currencies forming a synthetic currency pair having a first currency and a second currency from bid and offer orders entered into the computerized system for transactions between a currency pair comprising the first currency and a third currency and bid and offer orders entered into the computerized system for transactions between a currency pair comprising the second currency and the third currency;

at least one of the one or more computers matching and executing joint execution orders by performing only one of:

executing, as separate trades, all linked orders of a joint execution order entered into the computer system; and rejecting all linked orders of a joint execution order entered into the computer system, and wherein;

the method further includes at least one of the one or more computers converting a bid or offer order in said synthetic currency pair into a joint execution order comprising an order in each of said currency pair comprising the first and third currency and said currency pair comprising the second and third currency.

17. The method according to claim 16, the method further comprising at least one of the one or more computers receiving, from an order input device, a joint execution order comprising two or more linked orders.

18. A computer system comprising:

one or more computers configured to receive, from at least one of a plurality of order input devices, a joint execution order comprising two or more linked orders;

one or more computers configured to:

synthesize bid and offer orders for transactions between a pair of currencies forming a synthetic currency pair having a first currency and a second currency from bid and offer orders entered into the computer system for transactions between a currency pair comprising the first currency and a third currency and bid and offer orders entered into the computer system for transactions between a currency pair comprising the second currency and the third currency;
match and execute joint execution orders, so as to perform only one of:
executing, as separate trades, all of the linked orders of the joint execution order; and
rejecting all of the linked orders of the joint execution order; and
one or more computers configured to convert a bid or offer order in said synthetic currency pair into a joint execution order comprising an order in each of said currency pair comprising the first and third currency and said currency pair comprising the second and third currency.

19. A computer system comprising:
one or more computers configured to synthesize bid and offer orders for transactions between a pair of currencies forming a synthetic currency pair having a first currency and a second currency from bid and offer orders entered into the computer system for transactions between a currency pair comprising the first currency and a third currency and bid and offer orders entered into the computer system for transactions between a currency pair comprising the second currency and the third currency;
one or more computers configured to match and execute joint execution orders, so as to perform only one of:
executing, as separate trades, all linked orders of a joint execution order entered into the computer system; and
rejecting all linked orders of a joint execution order entered into the computer system; and
one or more computers configured to convert a bid or offer order in said synthetic currency pair into a joint execution order comprising an order in each of said currency pair comprising the first and third currency and said currency pair comprising the second and third currency.

* * * * *